Nov. 13, 1962  J. B. OSBORNE  3,063,932
METHOD AND APPARATUS FOR CRACKING HYDROCARBONS
Filed Dec. 17, 1958
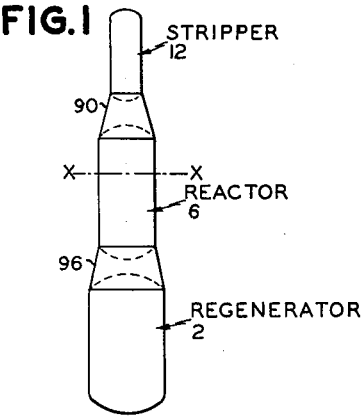
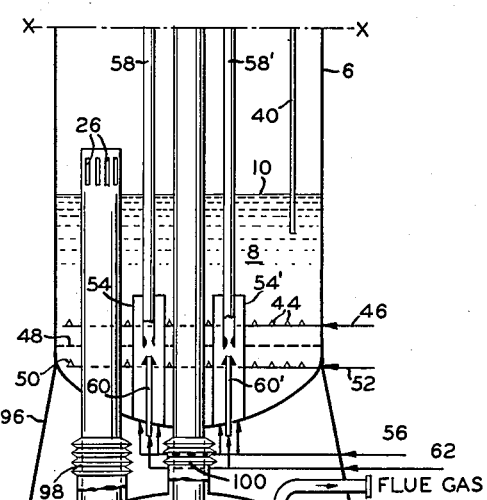
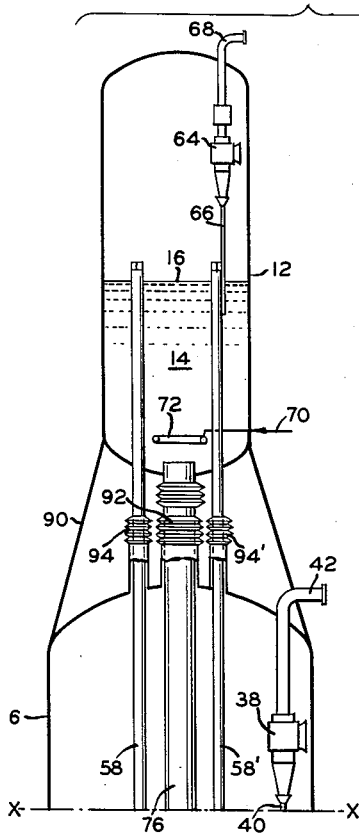
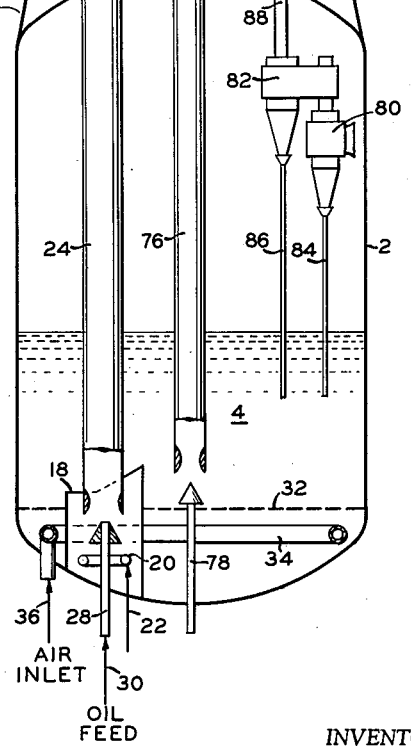
INVENTOR.
JOHN B. OSBORNE
BY
ATTORNEY
AGENT

# United States Patent Office 3,063,932
Patented Nov. 13, 1962

3,063,932
METHOD AND APPARATUS FOR CRACKING HYDROCARBONS
John B. Osborne, South Orange, N.J., assignor to The M. W. Kellogg Company, Jersey City, N.J., a corporation of Delaware
Filed Dec. 17, 1958, Ser. No. 780,977
8 Claims. (Cl. 208—74)

This invention is directed to an improved apparatus for contacting gaseous and vaporous material with finely divided contact material. In one aspect it relates to an improved method and arrangement of apparatus in a unitary vessel for effecting the conversion of hydrocarbon reactant material in the presence of finely divided catalytic material and the removal of products of the hydrocarbon conversion reaction from the catalyst.

The technique of contacting finely divided catalytic material with gaseous and vaporous materials such as for the catalytic conversion of hydrocarbons is becoming increasingly important to the petroleum refiner. In such processes the catalyst is employed in a finely divided condition in order that it may be supported in the desired gaseous or vaporous material and capable of flowing through the apparatus like a liquid. In addition, these processes include several separate and distinct steps including the conversion of hydrocarbon reactant, stripping of the catalyst, regeneration of the catalyst and returning the regenerated catalyst to the hydrocarbon conversion steps.

It is an object of this invention to provide an improved system within a unitary apparatus for contacting finely divided contact material with gaseous and vaporous material.

Another object of this invention is to provide an improved apparatus for the cyclic circulation of finely divided contact material through a plurality of sequentially connected contact steps.

Other objects and advantages of the process of this invention will become apparent from the following description.

Accordingly, a system is provided by this invention for contacting a vaporous chemical reactant with fluidized finely divided catalytic material in a first elongated reaction compartment from which the product effluent and catalyst is discharged and separated. The product of the first reaction compartment is recovered and passed to suitable separation equipment with the finely divided catalytic material separated from the first reaction compartment being passed without stripping to a second reaction compartment wherein it is subjected to contact in a fluidized condition with a second reactant material which may be the same as or different than the chemical reactant employed in the first reaction compartment. During this sequential contact of the finely divided catalytic material with the chemical reactant which may be a hydrocarbon reactant, elevated temperatures are normally employed and easily recoverable reaction products are produced, as well as more difficulty recoverable products which cling to or are absorbed by the finely divided catalytic material. Thus the catalyst becomes contaminated with both volatile and nonvolatile products of reaction which impairs the activity of the catalyst and must be removed prior to further use in the process. The deposition of these volatile and nonvolatile reaction products is in part desirable when properly treated. That is, the difficultly vaporizable material which is absorbed by the finely divided catalytic material requires in most instances an extended period of contact with the catalyst to convert at least part of these materials to desired recoverable products, as well as carbon or carbonaceous deposits. A certain amount of carbonaceous deposits on the catalyst is highly desirable in a system of this kind since the burning of these deposits with an oxygen-containing gas can be effectively employed to furnish a major portion of the large amounts of endothermic heat required in the process. Accordingly, the catalyst withdrawn from the last of the series of reaction or conversion compartments and containing a considerable quantity of absorbed reaction products including high-boiling hydrocarbon constituents may, under proper conditions of treatment, be made to yield additional product material which otherwise would be lost from the process through burning during regeneration of the catalyst. Furthermore, by controlling the quantity of carbonaceous contaminant on the catalyst, investment in additional expensive equipment for the combustion of excessive hydrocarbons and/or carbonaceous deposits can be materially reduced or virtually eliminated. Therefore, in accordance with one embodiment of this invention the catalyst withdrawn from the last of the series of conversion compartments or zones which is contaminated with products of the hydrocarbon conversion is passed through a series of sequentially connected treating steps designed to more efficiently and completely remove absorbed hydrocarbon constituents from the catalyst. These treating steps comprise passing the contaminated catalyst through a first relatively dense fluidized catalyst bed stripping compartment maintained at substantially reaction temperature and pressure conditions wherein the easily strippable hydrocarbon conversion products are removed with a suitable stripping gas. Thereafter, the partially stripped catalyst is subjected to a second stripping treatment under reduced pressure conditions in the presence of a large excess of stripping gas to produce a dilute or dispersed phase stripping step whereby the partial pressure of the absorbed hydrocarbon on the catalyst is substantially reduced thereby removing additional absorbed hydrocarbon products from the finely divided catalyst. It has been found, however, that the thus stripped catalyst still contains a residual quantity of higher boiling hydrocarbon material which may be effectively converted and removed from the catalyst by subjecting the catalyst to an extended dense catalyst phase soaking or conversion period at a reduced pressure and elevated temperatures which may be as high or higher than the reaction temperatures whereby these residual high boiling hydrocarbon materials are further cracked in the presence of a suitable stripping gas and removed from the catalyst. The residence time of the catalyst in the dispersed phase or dilute phase stripping step should be as short as possible, and preferably not more than about 3 seconds with the residence time of the catalyst in the soaking conversion step maintained as long as possible, and at least 45 seconds. In the soaking conversion step of this invention the catalyst is maintained in a relatively dense fluidized condition at a temperature of from about 900° F. to about 975° F., and a pressure of from about 10 to about 25 p.s.i.g., as the fluidized catalyst moves generally downwardly through the soaking compartment countercurrent to stripping gas introduced to the lower portion thereof. Suitable stripping gases which may be employed are steam, flue gas, normally gaseous hydrocarbons such as methane, ethane, propane and/or mixtures thereof.

The rate of deposition of carbonaceous material on the catalyst will vary widely for different processes depending upon the feed material employed, the extent of conversion and reaction conditions employed therein. The present invention is applicable, however, to a system in which 1 cubic foot of oxygen-containing gas is required per pound of catalyst being circulated or generally from about 0.3 to about 3 cubic feet per pound of catalyst.

In the process of this invention a fresh hydrocarbon feed material is contacted in a primary reactor or first reaction zone with regenerated catalyst and cracked at an elevated temperature above about 975° F., and preferably from about 1000 to about 1025° F., employing a high weight space velocity being defined as the quantity of oil feed which is processed per hour relative to the quantity of catalyst employed or present in the reaction zone. The primary reactor or first hydrocarbon conversion stage of this invention is a transfer line conversion zone in which the velocity is approximately from about 3 to about 40 feet per second and the fluid density of the catalyst may be in the range of from about 5 to about 30 pounds per cubic foot.

In the primary reactor, the most easily cracked portion of the feed stock is converted while a more difficult material to be cracked, which may be obtained from the primary conversion zone or other suitable zones, is cracked in the secondary reactor or reaction zone. The cracking temperature employed in the secondary reaction zone may be from about 875 to 975° F., with the reaction pressure in both hydrocarbon conversion zones being maintained in the range of from about 10 to about 50 p.s.i.g., and preferably from about 15 to about 25 p.s.i.g. The weight space velocity on the hydrocarbon feed material charged to the secondary reactor may be from about ½ to about 20, preferably from about 1 to about 5. The catalyst to oil ratio on a weight basis will generally come within the range of from about 2 to about 25, preferably from about 10 to about 20.

As a result of the catalytic conversion steps mentioned above, volatile and nonvolatile carbonaceous material is deposited on or absorbed by the catalyst and a portion of this contaminated catalyst is withdrawn from the secondary reactor into a first-stage stripper, which is a well surrounding the lower end of a riser conduit. The first-stage stripper is preferably a vertically cylindrical vessel surrounding the lower end of the riser into which is passed an annular column of contaminated catalyst which column passes downwardly through the well countercurrent to stripping gas introduced to the lower portion thereof. It is to be understood, of course, that the well may or may not extend above the level of the dense catalyst bed in the secondary reactor. When the first stage stripper is of a height such that it does extend above the level of the dense catalyst bed, catalyst is transferred into the stripper from the dense catalyst bed generally through louvers or ports in the wall of the stripper and in this embodiment the stripping gas will not pass through the dense catalyst bed in the secondary reactor, but instead pass out of the top of the stripper well to be commingled with the reaction products above the bed of catalyst. In the case where the stripper well does not extend above the level of the dense catalyst bed the stripping steam introduced into the bottom of the well passes upwardly into and through the fluidized bed of catalyst in the secondary reactor. In any event the stripper well is of such size and diameter to permit the passage of an annular column of contaminated catalyst downwardly through the well countercurrent to suitable stripping gas. Accordingly, the stripper may have a diameter of from about 10 to about 50%, preferably from about 15 to about 30% of the reactor diameter. In addition, it is to be understood that a plurality of these wells may be employed in conjunction with the riser conduits hereinafter described.

From the first stage stripper and specifically the lower portion thereof, the partially stripped catalyst is mixed with a large quantity of a suitable lift gas such as steam and passed upwardly through a second dilute phase transfer line stripping conduit to the upper portion of a soaking conversion compartment positioned above the secondary reactor compartment of the apparatus of this invention. In the spent catalyst riser or the dilute phase stripping conduit, a second stage of stripping occurs at an elevated temperature of from about 900 to about 975° F., and at a reduced pressure of from about 1 to about 15 p.s.i.g. The density of the catalyst in the transfer line stripper may be in the range of from about 1 to about 15 lbs. per cubic foot with the velocity of the lift gases employed in the riser being in the range of from about 3 to about 50 feet per second. As hereinbefore indicated, the transfer line stripper extends to the upper portion of a soaking conversion compartment wherein a relatively dense fluid bed of the contaminated catalyst is maintained to complete the conversion of the high boiling hydrocarbons absorbed by the catalyst. In addition to the soaking conversion which takes place in this compartment, additional stripping of the catalyst occurs at a lower pressure than that previously employed and at a temperature which may be as high as the hydrocarbon conversion temperature and even higher. Accordingly, the soaking conversion compartment is maintained under superatmospheric pressure in the range of from about 1 to about 15 p.s.i.g., to which additional stripping gas at an elevated temperature is introduced to the lower portion of the fluidized bed of catalyst therein which moves generally downwardly through the compartment. As hereinbefore discussed, it is essential that the catalyst containing absorbed high-boiling hydrocarbon constituents be retained in the soaking conversion compartment for a sufficient length of time to effect substantial cracking of these high-boiling hydrocarbon constituents into lower boiling products. To accomplish this end it is essential that the compartment be sufficiently large to provide a residence time greater than about 1 minute and up to about 5 minutes. The catalyst recovered in the bottom of the soaking conversion compartment and containing appreciable quantities of non-vaporizable carbonaceous deposits resulting from the conversion steps previously discussed is withdrawn from the bottom of the bed and passed downwardly through a substantially vertical standpipe through the secondary reactor into the lower portion of a dense fluidized bed of catalyst maintained in a regenerator chamber positioned beneath the secondary reactor chamber. From the foregoing it is apparent, therefore, that the present invention results in an improved and effective removal of hydrocarbon conversion products from the catalyst prior to passing the contaminated catalyst to the regeneration zone for removal by burning in an oxygen-containing gas.

In the regenerator the catalyst is regenerated and the carbonaceous deposits removed by burning by contacting the contaminated catalyst with an oxygen-containing gas such as air or diluted air under elevated regeneration temperature conditions of from about 1050 to about 1200° F., and preferably about 1150° F. The pressure in the regenerator may be in the range of from about 15 to about 30 p.s.i.g., and generally the pressure in the regenerator will be higher than that employed in the remaining contact compartments. Simultaneously with the introduction of contaminated catalyst into the fluid bed of catalyst undergoing regeneration in the regeneration compartment a portion of regenerated catalyst is removed from the dense fluidized catalyst bed through a first stripping well countercurrent to suitable stripping gas introduced into the lower portion thereof and thereafter the catalyst passes into the inlet of the first hydrocarbon conversion compartment or transfer line conversion compartment for conversion of the fresh feed material as hereinbefore described. It is to be understood that at least one transfer line conversion compartment is to be employed, and it is contemplated within the scope of this invention to employ a plurality of transfer line conversion compartments. In addition, although in the preferred apparatus of applicant's invention the transfer line conversion compartment or conduit is shown to extend above the dense bed of catalytic material maintained in the secondary reactor compartment, it is to be understood that the transfer line reactor or riser conduit may terminate in the lower portion of the secondary reactor and below a horizontally disposed grid placed in the lower portion of the secondary reactor. When operating with the riser or transfer line conversion conduit either above or below the upper dense bed level, additional feed material such as cyclic oil or other more fractory hydrocarbon feed material may be introduced into the lower portion of the dense fluidized catalyst bed in addition to the hydrocarbon reactant material passing upwardly through the riser.

The hydrocarbon feed materials or oils which are especially suitable for use as fresh feed to the primary reactor or first transfer line reactor have an initial boiling point of from about 400 to about 600° F., an end point of about 700 to about 1300° F., and an API gravity in the range of from about 10 to about 40, these hydrocarbons being, for example, gas oils, reduced crudes, residual oils, heavy distillates, and the like. The feed to the secondary reactor or secondary reaction zone may also be a fresh hydrocarbon feed material, as previously described, but it is preferred to employ a cycle oil product of the first and second conversion zones having an initial boiling point of about 400 to about 700° F., an end point of about 800 to about 1400° F., and an API gravity in the range of from about 5 to about 35.

The catalyst to be employed in the process of this invention may be any suitable catalytic cracking catalyst, however, it is preferred that it be a siliceous material containing from about 70 to about 90% by weight of silica with the remainder being 1 or more of another material, such as alumina, magnesia, zirconia and boria and the like. For example, the catalyst may be silica-alumina, silica-alumina-magnesia, silica-magnesia, silica-alumina-zirconia, silica-alumina-boria.

In the system described herein, the regenerator generally has a diameter of from about 1 to about 3 times as great as the diameter of the dense phase reactor. Accordingly, the regenerator contains more catalyst than does the dense phase reactor and the regenerated catalyst bed generally contains from about 1.5 to about 5 times as much catalyst on a weight basis as does the dense phase reactor catalyst bed. Furthermore, from about 5 to about 15 lbs. of catalyst per hour are being circulated per pound of catalyst present in the combined reaction zones. It is to be specifically noted that the apparatus employed to effect the process of this invention is of the double head type with the regenerator positioned at the bottom of the vessel, the secondary reactor forming the intermediate portion of the vessel and the soaking reactor forming the top portion of the vessel. In this double head system the vessels are connected by a suitable skirt means or a structure in the form of a conical frustrum containing suitable openings for the passage of air and access to the vertically movable plug valves positioned particularly in the lower portion of the secondary reactor. It is to be understood, however, that a single head may be employed between the intermediate secondary reactor and the top soaking reactor rather than provide the supporting structure as shown.

Reference is now made by way of example to the accompanying drawing consisting of FIGURES 1 and 2 which illustrates in diagrammatic elevation a preferred embodiment of the present invention.

A unitary apparatus is shown having a lower regeneration chamber 2 containing a dense fluidized bed of contact material 4, an intermediate reactor chamber 6 containing a dense fluidized bed of contact material 8 having an upper meniscus 10 and a soaking or stripping chamber 12 containing a dense fluidized bed of contact material 14 having an upper meniscus 16. The chambers 2, 6 and 12 are positioned above one another and coaxially aligned with one another. In order to effect the cyclic circulation of contact material through the respective chambers, a plurality of interconnecting conduits are provided as follows. Positioned within the lower portion of the regeneration chamber and extending upwardly from the bottom thereof is provided a well, which may be cylindrical in shape, defined by wall 18. Positioned in the lower portion of the well is an annular distributing means 20 through which suitable aerating or stripping gas is introduced by conduit 22. Extending from the lower portion of well 18 and coaxially aligned therewith is a riser conduit 24 of smaller diameter than the well 18 which extends substantially vertically upwardly through the regenerator chamber to the upper portion of the reactor chamber and above the upper meniscus 10 of the dense fluidized bed 8 positioned in the intermediate reactor chamber 6. The upper end of riser conduit 24 is capped by a distributing device referred to as a "bird cage" which is formed by closing the upper discharge end of the riser conduit and providing a plurality of elongated discharge slots 26 around the upper periphery of the riser conduit. In order to introduce a hydrocarbon reactant to the bottom open end of riser conduit 24 a vertically movable hollow stem plug valve 28 is aligned therewith to which a suitable hydrocarbon feed material may be introduced by conduit 30 for admixture with contact material from the well with the mixture passed upwardly through the riser as a relatively dilute suspension of contact material with hydrocarbon reactant.

A perforated grid member 32 is positioned in the lower portion of the regenerator chamber 2 and below the open upper end of the well defined by wall 18. Positioned within the space beneath grid 32 and the bottom of the regenerator chamber 2 there is provided an annular distributing ring 34 for the introduction of regeneration gas such as air by conduit 36. The regeneration gas such as air passes upwardly through the perforated grid 32 at a velocity sufficient to maintain the bed of contact material 4 in the lower portion of the regenerator in a relatively dense fluidized condition while effecting the regeneration of contaminated contact material therein. As hereinbefore discussed, a suitable hydrocarbon feed material admixed with finely divided contact material is passed upwardly through riser conduit 24 to above the bed of contact material 8 in the intermediate reactor chamber 6. The products of reaction and entrained contact material are discharged through slots 26 into the relatively dispersed phase above the bed 8 and separated such that the contact material falls into the bed 8 with the vaporized product being discharged through cyclone separator 38. In the cyclone separator 38 the products of reaction are further separated from entrained catalyst with the separated catalyst being returned to the bed through dipleg 40. The vaporous products are removed by conduit 42 from the reactor chamber and sent to suitable recovery equipment, not shown, for separation into desired product material. While only one riser conduit 24 has been shown, it is to be understood that a plurality of riser conduits may be employed in the apparatus of this invention. For example, two or more riser conduits may be suitably employed such that a hydrocarbon reactant of the same or different boiling range may be separately passed upwardly through the riser under conversion conditions. In the intermediate reactor 6, provisions are made for introducing an additional hydrocarbon reactant material to the lower portion of the dense fluidized bed through distributing device 44 connected to conduit 46. The distributing device being positioned above a perforated grid member 48 extending across the lower cross sectional area of the reactor chamber with an annular distributing means 50 positioned beneath the grid 48 for the introduction of an inert gaseous material such as steam to assist in the fluidization of the catalyst bed 8 above the grid 48. The gaseous material is introduced to the distributing means 50 by conduit 52. In the lower portion of the reactor chamber 6 and extending upwardly from the bottom thereof into the fluid bed of contact material is a plurality of catalyst withdrawal wells 54 and 54' which may be cylindrical in shape. When two riser conduits 24 are employed with two wells 54 and 54', they will be alternately spaced from one another and 90 degrees apart for more uniform dispersal and withdrawal of contact material. The wells 54 and 54' are open at their upper end for withdrawal of contaminated contact material from the dense fluidized bed 8 for passage downwardly through the well countercurrent to stripping gas introduced to the bottom of the well by conduit 56. In another embodiment, the withdrawal wells 54 and 54' may extend above the upper meniscus of the bed of contact material with suitable slot means provided within the walls of the wells for passing contact material from the dense bed into the well. Coaxially positioned within the wells are riser conduits 58 and 58' which extend from the lower portion of the well substantially vertically upwardly through the reactor chamber and the soaking or stripping chamber to above the upper level 16 of the relatively dense bed of contact material 14 maintained in chamber 12. Aligned with the bottom open end of riser conduits 58 and 58' are vertically movable hollow stem plug valves 60 and 60' for the introduction of lift gas such as steam by conduit 62. Accordingly, finely divided contact material withdrawn from the fluidized bed 8 passes downwardly into the well countercurrent to stripping gas to remove the most volatile hydrocarbon material on the contact material. This material is then passed upwardly through risers 58 and 58' with a lift gas such as steam to effect additional stripping of the contaminated contact material. The finely divided contact material dispersed in the lift gas is then discharged from the riser or transfer line stripping chamber above the bed of contact material in the soaker-stripper chamber. The upper end of riser conduits 58 and 58' are provided with a "bird cage" arrangement, similar to that described in connection with riser conduit 24. Of course, any other suitable device which will reduce the vertical velocity component of the suspension may be employed. The contact material dispersed in the lift gas is separated by settling in the relatively dilute phase above the dense bed 14 with the contact material falling into the fluid bed 14. The lift gas containing stripped products of reaction and incompletely free of entrained finely divided contact material is then passed through cyclone separator 64 wherein entrained contact material is separated from the gaseous material with the separated contact material returned to bed 14 by dipleg 66. The stripped products of reaction are removed from the cyclone and withdrawn from the stripper-reactor by conduit 68.

In the soaker-stripper-reactor, absorbed high-boiling hydrocarbons remaining on the contact material are then subjected to further soaking treatment at an elevated temperature wherein the hydrocarbons are cracked and stripped from the catalyst as the fluidized bed of contact material moves generally downwardly through the bed countercurrent to stripping gas introduced to the lower portion of the bed by conduit 70 through a distributor ring 72. The stripped contact material is withdrawn from the bottom of the chamber 12 beneath the point of introduction of stripping gas and passed substantially vertically downwardly through conduit or standpipe 76 through the reactor chamber and regenerator chamber to the lower portion of the fluidized bed 4 therein. Coaxially aligned with the bottom open end of standpipe 76 is a vertically movable plug valve 78. Accordingly the cyclic circulation of contact material through the unitary vessel is completed by the return of the stripped contact material by standpipe 76 to the regenerator chamber 2. As hereinbefore indicated, suitable regeneration gas such as air introduced to the bottom of the fluidized bed of contact material 4 in the regenerator chamber effects combustion of the carbonaceous material, thereby restoring the activity of the catalyst and heating the catalyst to an elevated temperature to supply the major portion of the endothermic heat required in the system. Flue gases resulting from this combustion are removed from the upper portion of the bed, passed through suitable cyclone separators 80 and 82 provided with diplegs 84 and 86 for return of finely divided contact material to the bed 4 which is separated from the flue gases in the cyclone separators. Flue gases are then removed from the upper portion of the regenerator by conduit 88.

While the chamber 12 is shown to be separated from chamber 6 by a conical support member 90, it is to be understood that this may be eliminated and a common head exist between these chambers. In the embodiment shown herein with the conical skirt member 90, expansion joints 92 and 94 are provided for expansion of the standpipe 76 and the riser conduits. However, the reactor chamber 6 is separated from the regenerator 2 in order to provide suitable space for the vertically movable hollow stem plug valves 60 and 61 for the introduction of lift gas to the riser conduits 58 and 58'. Accordingly a conical skirt member 96 or similar structure vented to the atmosphere is provided as supporting structure to separate the intermediate chamber from the lower chamber. In addition, expansion means 98 and 100 are provided for riser conduit 24 and standpipe 76.

Having thus described a preferred apparatus arrangement of this invention reference is now had to the accompanying data which sets forth in detail the dimensions of a specific embodiment of this apparatus design.

*Stripper Dimensions*

| | |
|---|---|
| Diameter | 12 feet I.D. |
| Stripper length | Approximately 28 feet. |
| Stripper bed height | Approximately 12 feet. |

*Reactor Dimensions*

| | |
|---|---|
| Diameter | 22 feet I.D. |
| Height | Approximately 40 feet. |
| Catalyst bed depth minimum | 13 feet. |
| Catalyst bed depth maximum | 22 feet. |

*Regenerator Dimensions*

| | |
|---|---|
| Diameter | Approximately 28 feet. |
| Height | Approximately 38 feet. |
| Catalyst bed depth | Approximately 15 feet. |

In the operation of the apparatus herein described, it is proposed in a specific example to carry out the conversion of hydrocarbon feed materials under the specific operating conditions presented below.

*Operating Data*

A. TRANSFER LINE (RISER) CRACKING

| | |
|---|---|
| Riser temperature, ° F. | 1000 |
| Riser pressure, p.s.i.g. | 28 |
| Catalyst to oil ratio | 20 |
| W./hr./w | 150 |
| Feed rate: | |
| B.p.s.d. | 35,000 |
| #/hr. | 455,330 |

B. DENSE BED CRACKING

| | |
|---|---|
| Reactor temperature, ° F. | 900 |
| Reactor pressure, p.s.i.g. | 20 |
| Catalyst to oil ratio | 40 |
| W./hr./w | 0.8 |
| Feed rate: | |
| B.p.s.d | 17,500 |
| #/hr. | 235,000 |

C. TRANSFER LINE STRIPPING

| | |
|---|---|
| Riser temperature, ° F. | 900 |
| Pressure, p.s.i.g. | 28.8 |
| Ratio catalyst to stripping gas | 333 (wt.) |

D. DENSE BED STRIPPING

| | |
|---|---|
| Stripper temperature, ° F. | 900 |
| Stripper pressure, p.s.i.g. | 11.6 |
| Ratio catalyst to stripping gas | 333 (wt.) |

E. REGENERATION CONDITIONS

Temperature, ° F. _____ 1150
Pressure, p.s.i.g. _____ 28

Having thus described my invention, it should be understood that no undue limitations or restrictions are to be imposed by reasons thereof.

I claim:

1. A method for the catalytic conversion of hydrocarbons which comprises passing a first hydrocarbon reactant material in contact with finely divided catalytic material in a first high temperature cracking zone to convert said reactant material into desired product material, thereby contaminating said catalytic material, separating product material from catalytic material discharged from said first high temperature cracking zone above a relatively dense fluid bed of catalytic material in a second cracking zone, passing the separated catalytic material into the relatively dense bed of catalytic material and contacting it with a vaporizable hydrocarbon reactant material at a lower temperature than that employed in said first cracking zone to produce a product material lower boiling than said vaporizable hydrocarbon material, recovering the product material of said high and low temperature cracking zones as a combined stream, withdrawing catalytic material contaminated with vaporizable and nonvaporizable carbonaceous material from the lower portion of said relatively dense fluid bed, passing the withdrawn contaminated catalytic material as a suspension in a gaseous material upwardly to above a second relatively dense fluid bed of catalytic material in a zone maintained at a lower pressure than the pressure employed in said second cracking zone, separating catalytic material from gaseous material above said second relatively dense fluid bed and passing the separated catalytic material into said second fluid bed, maintaining said second fluid bed of catalytic material at an elevated temperature as it moves generally downwardly countercurrent to gaseous material introduced to the lower portion thereof, withdrawing gaseous material from the upper portion of said low pressure zone and passing catalytic material from the bottom thereof to a regeneration zone surrounding the lower portion of said first high temperature cracking zone.

2. In a process for the conversion of hydrocarbon reactant material in the presence of finely divided catalytic material, the improved method of operation which comprises passing a suspension of finely divided catalytic material in a vaporous hydrocarbon reactant through an elongated confined conversion zone maintained at a relatively elevated temperature from a zone of high pressure to a first separation zone of lower pressure, separating products of reaction from said catalyst in said first separation zone, passing the separated catalyst into a first relatively dense fluid bed of catalyst maintained in the lower portion of said first separation zone for contact with additional hydrocarbon reactant material, withdrawing catalytic material from the lower portion of the first relatively dense fluid bed of catalyst and passing the same in admixture with a gaseous material as a suspension from the lower portion of said first relatively dense bed of catalyst upwardly to the upper portion of a second separation zone maintained at a lower pressure than the pressure in said first separation zone, separating catalytic material from gaseous material in the upper portion of said second separation zone, passing the separated catalyst downwardly through said second separation zone as a relatively dense fluid bed of catalyst countercurrent to gaseous material introduced to the lower portion of the zone, withdrawing catalyst from the bottom of said second separation zone and passing the same downwardly as an elongated confined dense stream of catalyst to the lower portion of a relatively dense bed of catalyst material in said high pressure zone and separately withdrawing gaseous products from the upper portion of each of said zones.

3. A method for cracking hydrocarbon reactant material in the presence of finely divided catalytic material which comprises maintaining a relatively high pressure regeneration zone, a conversion zone of lower pressure than said regeneration zone and a stripping zone of lower pressure than said conversion zone, each of said zones containing a relatively dense fluid bed catalyst phase in the lower portion of the zone with a more dilute catalyst phase in the upper portion of the zones, passing catalytic material as a suspension in a first reactant material from the lower portion of the catalyst bed in the regeneration zone into the dilute catalyst phase in the conversion zone through at least one confined zone under elevated temperature cracking conditions, separating catalyst from product material in said conversion zone dilute phase by settling, contacting said settled catalyst in the conversion zone with a second reactant material higher boiling than said first reactant material, passing catalytic material as a suspension in a gaseous material from said conversion zone into the dilute phase in said stripping zone, separating catalytic material from gaseous material in said stripping zone by settling, stripping settled catalytic material in said stripping zone under elevated temperature conditions for at least about one minute, and passing stripped catalyst from the lower portion of said stripping zone substantially vertically downwardly through said conversion zone to said regeneration zone.

4. A method for cracking hydrocarbon reactant materials in the presence of finely divided catalytic material which comprises maintaining a relatively high pressure regeneration zone, a conversion zone of lower pressure than said regeneration zone and a stripping zone of lower pressure than said conversion zone, each of said zones containing a relatively dense fluid bed of catalytic material in the lower portion thereof, passing a first hydrocarbon reactant material containing catalytic material under elevated temperature cracking conditions from the lower portion of the regeneration zone upwardly into said conversion zone, introducing a second hydrocarbon reactant into the lower portion of said bed of catalyst in said conversion zone under conditions to crack said second hydrocarbon reactant to both volatile and nonvolatile product material, withdrawing catalytic material contaminated with volatile and nonvolatile product material from said conversion zone and passing the withdrawn contaminated catalytic material admixed with gaseous material to said stripping zone, separating catalytic material from gaseous material and passing the separated catalytic material downwardly through said stripping zone countercurrent to stripping gas introduced to the lower portion thereof and passing catalytic material from the lower portion of said stripping zone downwardly to the lower portion of the bed of catalytic material in said regeneration zone.

5. An apparatus comprising in combniation a lower regeneration chamber, an intermediate reaction chamber and an upper stripping chamber, said reaction chamber separated from said regeneration chamber by a skirt member open to the atmosphere, a perforated grid member extending across the lower cross-sectional area of each of said reaction and regeneration chambers, means for introducing a gaseous material beneath each of said grid members for flow upwardly therethrough, at least one first riser conduit extending from the lower portion of said regeneration chamber upwardly into said reaction chamber, means for introducing finely divided contact material and vaporizable material to the bottom of said first riser conduit, a plurality of second riser conduits extending from the lower portion of said reactor chamber upwardly into the upper portion of said stripping chamber, means for introducing finely divided contact material and gaseous material to the bottom of said second riser conduits, means for separately introducing gaseous material to the lower portion of said stripping chamber and a standpipe extending from the lower portion of said stripping chamber to the lower portion of said regeneration chamber.

6. An apparatus comprising in combination a lower regeneration chamber, an intermediate annular reactor chamber and an upper stripping chamber, said chambers being coaxially aligned with one another and provided with a standpipe extending downwardly from said stripping chamber to the lower portion of said regeneration chamber, said standpipe terminating above a perforated grid member extending across the cross-sectional area of said regeneration chamber, each of said chambers adapted to maintain a fluid bed of finely divided contact material therein, at least one cylindrical chamber open at its upper end extending upwardly from the bottom of said regeneration chamber through said perforated grid into said fluid bed of contact material, a first conduit extending from the lower portion of said cylindrical chamber substantially vertically upward to the upper portion of said reactor chamber, a perforated grid member extending across the lower cross-sectional area of said reactor chamber, at least one withdrawal chamber open at its upper end extending from the bottom of said reactor chamber upwardly through said grid into said fluid bed of contact material, a second conduit extending from within the lower portion of said withdrawal chamber substantially vertically upwardly into the upper portion of said stripping chamber, means for introducing a gaseous material beneath the grid means in said reactor chamber and said regeneration chamber, means for introducing a gaseous material to the lower portion of each of said cylindrical chambers, withdrawal chambers and said stripping chamber, means for introducing a vaporizable material to the lower portion of said first conduit and said first fluid bed in said reactor chamber, and means for separately withdrawing gaseous material from the upper portion of each of said chambers.

7. A method for contacting finely divided contact material with gasiform material which comprises maintaining a first relatively high pressure zone, a second zone of intermediate pressure and a zone of relatively low pressure above said second zone, each of said zones containing a relatively dense fluid bed of contact material therein, passing contact material as a suspension in a first vaporizable gasiform material from the lower portion of said first relatively high pressure zone as a confined stream into the upper portion of said zone of intermediate pressure and above the dense fluid bed of contact material therein, separating contact material from vaporous material in the upper portion of said zone of intermediate pressure and passing the separated contact material downwardly into the dense fluid bed in the lower portion thereof, passing gasiform stripping material upwardly through said dense fluid bed of contact material in said second zone, passing contact material from the lower portion of said second zone as a suspension in gasiform material as at least one confined stream into the upper portion of said zone of relatively low pressure and discharging the suspension above a dense fluid bed of contact material therein, separating contact material from gaseous material in the upper portion of said zone of relatively low pressure to form said dense fluid bed, passing gaseous material upwardly through said dense fluid bed in said relatively low pressure zone and withdrawing contact material from the lower portion of said dense fluid bed for passage downwardly as a confined stream to the lower portion of said first relatively high pressure zone.

8. A method for cracking hydrocarbon reactant materials in the presence of finely divided catalytic material and the recovery of hydrocarbon products therefrom which comprises passing catalytic material with a first hydrocarbon reactant material at an elevated temperature in the range of from about 1000° F. to about 1025° F. upwardly as a suspension through an elongated confined cracking zone from the lower portion of a bed of catalyst in a regeneration zone into a dilute phase of catalyst above a dense phase of catalyst in a conversion zone, introducing a second hydrocarbon reactant material to be cracked into lower boiling range products into the lower portion of the dense bed of catalyst in said conversion zone maintained at a temperature in the range of from about 875° F. to about 975° F., separating hydrocarbon products from catalyst in the dilute phase of said conversion zone, withdrawing catalyst containing adsorbed reactant material from the lower portion of the dense catalyst phase in said conversion zone countercurrent to gaseous material introduced to the lower portion thereof and thereafter passing the catalytic material with additional gaseous material as at least one confined suspension upwardly into a dilute phase of catalyst above a dense phase of catalyst in a stripping zone above said conversion zone, separating catalytic material from gaseous material introduced into said stripping zone to form said dense phase of catalyst therebelow, passing the dense phase of catalyst in said stripping zone downwardly countercurrent to gaseous stripping material at a rate sufficient to maintain a catalyst residence time therein of at least about 1 minute while maintaining the bed of catalyst at an elevated temperature above about 875° F. and withdrawing stripped catalyst from the bottom portion of the dense bed of catalyst in the stripping zone for passage downwardly as a confined stream to the lower portion of said regeneration zone.

References Cited in the file of this patent

UNITED STATES PATENTS

| | | |
|---|---|---|
| 2,541,186 | Anderson | Feb. 13, 1951 |
| 2,698,281 | Leffer | Dec. 28, 1954 |
| 2,727,810 | Leffer | Dec. 20, 1955 |
| 2,776,248 | Hengstebeck et al. | Jan. 1, 1957 |
| 2,791,542 | Nathan | May 7, 1957 |
| 2,799,359 | Johnson | July 16, 1957 |
| 2,871,186 | Francisco et al. | Jan. 27, 1959 |
| 2,883,332 | Wickham | Apr. 21, 1959 |
| 2,891,001 | Wickham et al. | June 16, 1959 |
| 2,895,811 | Schaaf | July 21, 1959 |
| 2,900,324 | Patton et al. | Aug. 18, 1959 |